United States Patent [19]

Kawai et al.

[11] Patent Number: 5,301,294
[45] Date of Patent: Apr. 5, 1994

[54] ADDRESS BUS CONTROL SYSTEM

[75] Inventors: Takahiro Kawai; Masatsugu Shinozaki, both of Hadano; Hitoshi Sadamitsu, Hiratsuka; Tadashi Kyoda; Katsuya Takanashi, both of Hadano; Hironori Uchida, Ebina, all of Japan

[73] Assignees: Hitachi Ltd.; Hitachi Techno Engineering Co., Ltd., both of Tokyo, Japan

[21] Appl. No.: 689,556

[22] Filed: Apr. 23, 1991

[30] Foreign Application Priority Data

Apr. 23, 1990 [JP] Japan .................. 2-105396

[51] Int. Cl.⁵ ............................ G06F 12/02
[52] U.S. Cl. .................... 395/425; 395/400; 364/DIG. 1; 364/261.8
[58] Field of Search ... 364/200 MS File, 900 MS File; 395/400, 425

[56] References Cited

U.S. PATENT DOCUMENTS 4,701,878 10/1987 Gunkel et al. ............ 395/325
4,974,150 11/1990 Long et al. ............... 395/575
5,113,497 5/1992 Dewa ........................ 395/275

FOREIGN PATENT DOCUMENTS 58-195263 7/1982 Japan .
63-62062 3/1986 Japan .

Primary Examiner—Joseph L. Dixon
Assistant Examiner—Hiep T. Nguyen
Attorney, Agent, or Firm—Antonelli, Terry, Stout & Kraus

[57] ABSTRACT

An address bus control system is provided of the type in which a controller including a central processing unit is connected through an address bus and a data bus to hardware modules which control equipment to be controlled. An address space defined by an address bus includes a discrimination space for discriminating the attribute of the hardware module and a function space for allocating and clearing an address space for a function interface of the hardware module. The attribute of a hardware module connected to a connector having a corresponding address is recognized using the discrimination space. The function interface of each hardware module is assigned a space within the function space in accordance with the contents of the discrimination space in concern, or the assigned space is canceled. An address of the function space can be allocated to only a necessary function interface, merely by connecting the hardware module to the connector, allowing to set up hardware modules equal to or larger than the total address space.

15 Claims, 8 Drawing Sheets

F I G. 3
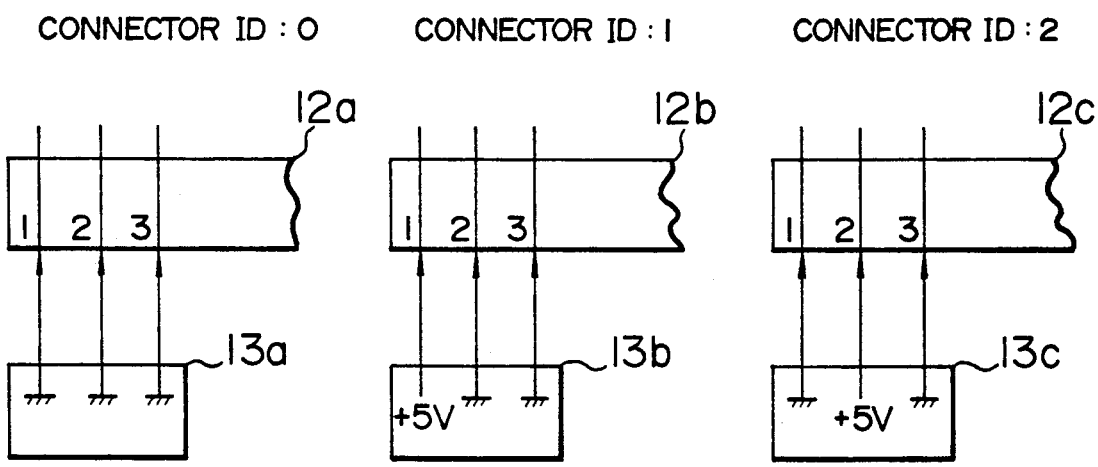

ADDRESS BUS CONTROL SYSTEM

BACKGROUND OF THE INVENTION

1. Field of the Invention

The present invention relates to a-terminal equipment capable of controlling an address space of a bus connecting a plurality of hardware modules, such as for allocating and clearing portions of the address space.

2. Description of the Related Art

Specific addresses are allocated to a plurality of memories by using modifier registers, according to a conventional method described in Japanese Patent Laid-open Publication JP-A-58-195263.

There is also described in Japanese Patent Laid-open Publication JP-A-63-62062 a method of allocating an address space using a switch of a hardware module when mounting it on terminal equipment.

The former conventional technique assigns a specific address space to a memory by setting a modifier register. This technique does not allow a CPU to recognize the capacity of a memory to which a specific address space has been allocated by the modifier register, i.e., the capacity of the memory occupying the address space. In order to allocate address spaces to hardware modules, mainly I/O adapters, without creating overlapping address spaces and idle address spaces, it is necessary to set a fixed capacity for each memory or the like having an address space allocated by the modifier register.

The conventional technique in JP-A-58-195263 aims at allocating address spaces to memories. It does not allow a CPU to recognize the type of each hardware module having an address space allocated by modifier registers.

With the former conventional technique, therefore, it is not possible to efficiently allocate address spaces to hardware modules, such as I/O adapters, of different types having different address space capacities.

The latter conventional technique does not allow a CPU to recognize the type and address space capacity of each hardware module, so that an operator has to check the address space capacity of the module, and to allocate an address space by using a switch when mounting the module on the terminal equipment when increasing the number of applications. Therefore, the operator is necessarily required to be an expert. Furthermore, there is a restriction that the total address spaces of hardware, such as memories and I/O adapters, should not exceed the total address spaces of a bus.

SUMMARY OF THE INVENTION

It is an object of the present invention to provide terminal equipment capable of flexibly assigning address spaces to a plurality of hardware modules without intervention of an operator.

In order to achieve the above object, a discrimination space and a function space are provided within a bus address space. Interfaces for discriminating attributes of all hardware modules constituting a system are assigned in the discrimination space. The interface of each hardware module assigned in the discrimination space is controlled from the bus side so that the function interface of each hardware module can be assigned to the function space or the assignment can be cleared, as desired.

In order to achieve the above object, the bus address space for hardware modules is partitioned into a space for discrimination interfaces and a space for function interfaces. Each discrimination interface has a main function to supply the attribute of its hardware module to the bus side, the addresses for the discrimination interface being fixedly set within the bus address space. Each function interface on the other hand has a function to operate its hardware module, the addresses for the function interface being determined on the bus side in accordance with information set in the corresponding discrimination interface.

With the system arrangement described above, it is possible to read the discrimination interfaces (recognize the configuration) of all hardware modules and hence their attributes (type of I/O, and its address space capacity) by accessing the discrimination space of the bus address space. While accessing the discrimination space, address information of hardware modules necessary for executing a software process at a given time can be set in the discrimination interfaces in concern. Thus, the function modules for the necessary hardware modules can be assigned suitable spaces within the function space. For the hardware module which becomes unnecessary, the address information stored in the corresponding discrimination interface is canceled, so that the function space assigned to the hardware module can be used by another hardware module.

In the above manner, the function space can be assigned space-divisionally and time-divisionally to a plurality of function interfaces of hardware modules. Such address allocation can be freely controlled without intervention of an operator.

As described above, according to the present invention, it is possible for the bus master to recognize attributes of all hardware modules connectable to the system, by accessing the discrimination space within a bus address space. Furthermore, the function interface of each hardware module can be assigned a function space as desired. Thus, the function space can be assigned space-divisionally and time-divisionally to function interfaces of hardware modules.

Still further, at the time of setting up the system, it is not necessarily required that the sum of address spaces for functional interfaces of all hardware modules is equal to or smaller than the function space within the address space. Address allocation for hardware modules at the time of setting up the system can be controlled by the bus master. Therefore, it is not necessary for an operator to have particular technical knowledge about the address space at the time of setting up the system or increasing the number of applications, thereby providing a self-setup system.

BRIEF DESCRIPTION OF THE DRAWINGS

FIG. 3 shows examples of connector IDs;

DETAILED DESCRIPTION OF THE PREFERRED EMBODIMENTS

Embodiments of an address bus control system of this invention will be described below with reference to the accompanying drawings.

Figure 1:
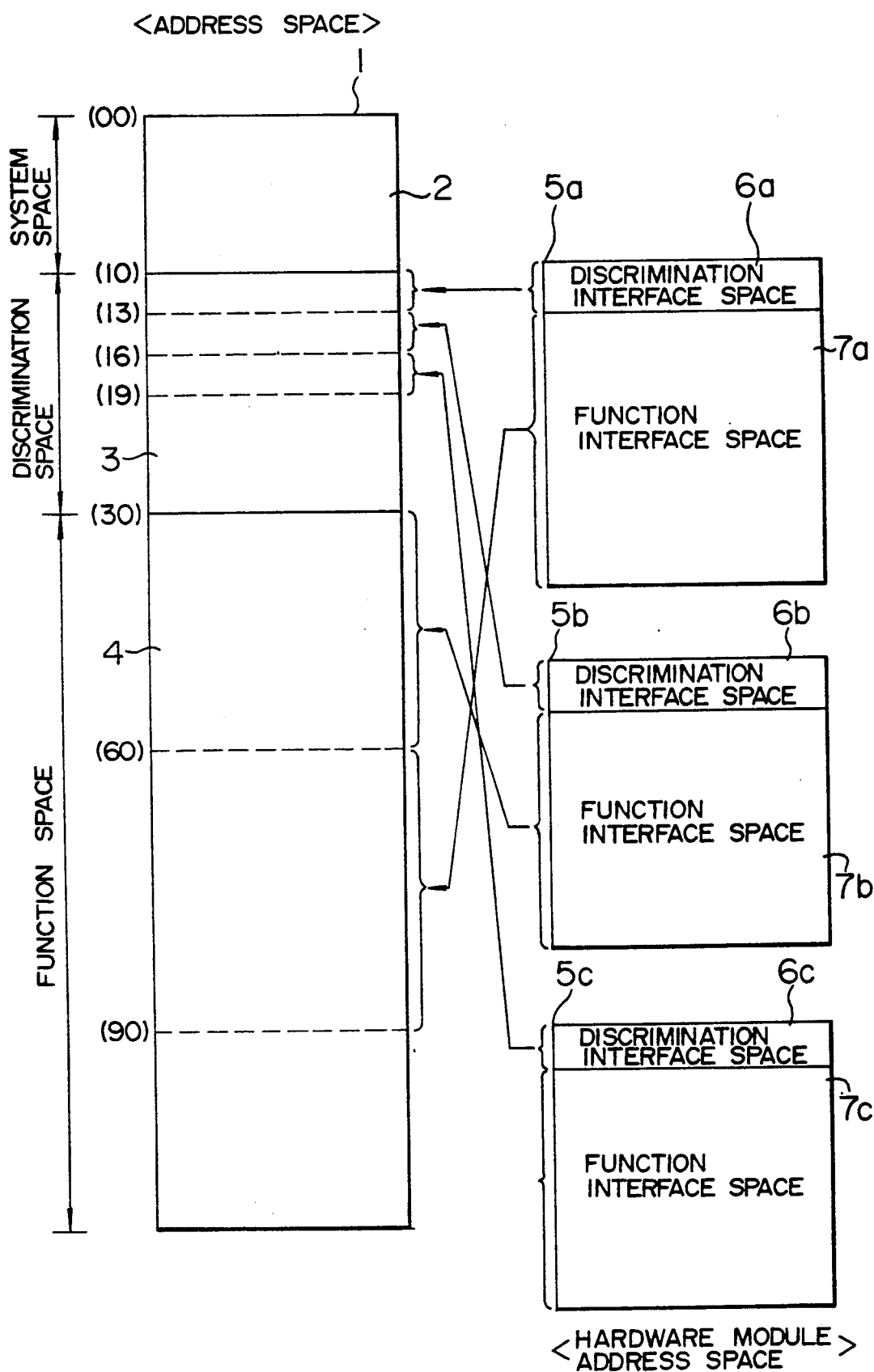
FIG. 1 is an address map illustrating an embodiment of an address bus control system according to the present invention.

FIG. 1 is an address map illustrating address space of an address bus and hardware modules. The whole address space 1 defined by an address bus is partitioned into a system space 2, discrimination space 3, and function space 4, the system space 2 being assigned a system core function of a CPU or the like.

An address space 5a of a hardware module is divided into a discrimination interface space 6a and a function interface space 7a. The discrimination interface space 6a is provided so that a CPU can read module attributes such as the type of the module, the capacity of the function space 4 allocated to the module, and the like.

Similar to the hardware module address space 5a, other hardware module address spaces 5b and 5c also have discrimination interface spaces 6b and 6c, and function interface spaces 7b and 7c.

Figure 2:
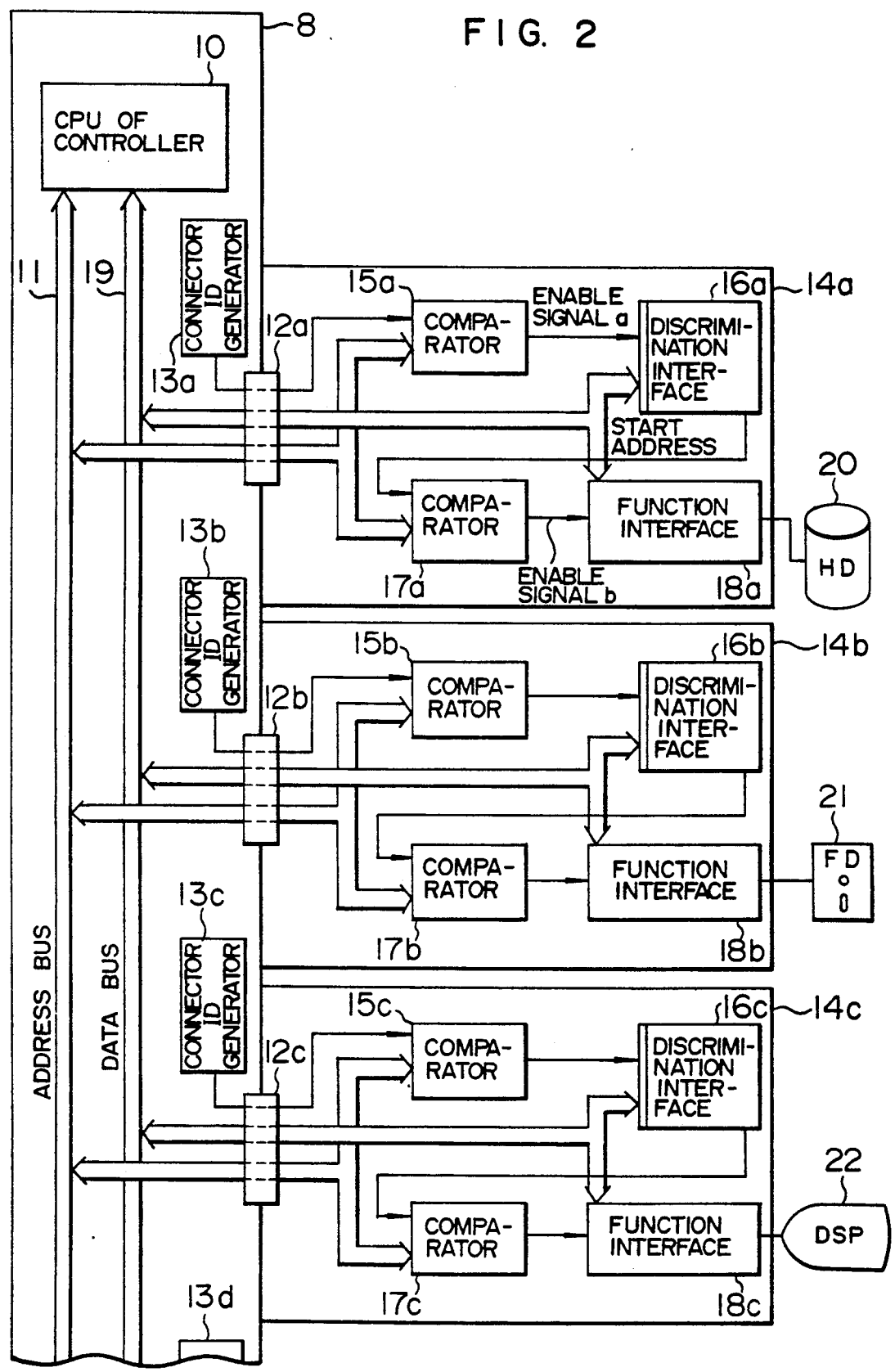
FIG. 2 is a block-diagram showing the address bus control system shown in FIG. 1.

FIG. 2 is a functional block diagram of the system shown in FIG. 1. A terminal equipment 8 has a controller including a Central Processing Unit (CPU) 10, the terminal equipment having the address space 1 shown in FIG. 1. CPU 10 is connected to an address bus 11 and a data bus 19 and to hardware modules 14a, 14b, and 14c via connectors 12a, 12b, and 12c, respectively. Each of connector ID (identifier) generators 13a, 13b, and 13c for outputting a connector ID is connected to the corresponding one of the hardware modules 14a, 14b, and 14c via the connectors 12a, 12b, and 12c, respectively.

The connector ID generators 13a, 13b and 13c will be described next.

The connector ID is used for identifying the connector to which a hardware module is connected. Specifically, each connector ID has a number specific to each connector so that a plurality of connectors mounted on the terminal equipment 8 have one-to-one correspondence with hardware modules at the connectors.

FIG. 3 shows examples of the connector ID with respect to the connector generators 13a, 13b, and 13c, and the connectors 12a, 12b, and 12c.

The connector ID generators 13a, 13b, and 13c apply +5 V or a ground potential to particular pins 1, 2, and 3 of each connector 12a, 12b, 12c, to thereby supply a connector ID to each hardware module. Each connector has therefore a connector ID specific thereto. Each hardware module reads this connector ID to confirm to which connector it is being connected.

The hardware modules 14a, 14b, and 14c shown in FIG. 2 have the hardware module address spaces 5a, 5b, and 5c shown in FIG. 1, respectively. For example, the hardware module 14a is provided with a function interface 18a for the data transfer control of a hard disk 20. Similarly, the hardware module 14b is provided with a function interface 18b for the data transfer control of a floppy disk 21, and the hardware module 14c is provided with a function interface 18c for the data transfer control of a display 22.

The operation of each hardware module is basically similar, so the operation of the hardware module 14a will be described by way of example.

The hardware module 14a has a comparator 15a, a discrimination interface 16a, another comparator 17a, and a function interface 18a. The comparator 15a compares an address pattern on the address bus 11 supplied via the connector 12a with the connector ID from the connector ID generator 13a. If the address pattern indicates the discrimination space of the hardware module 14a, then the comparator 15a outputs an enable signal a (a signal enabling connection of the discrimination interface to the data bus). Namely, the hardware module is supplied with an address pattern from the address bus 11, the address pattern being the address of the hardware module to be accessed by CPU 10. The range of addresses of the discrimination space on the address bus 11 is previously set in accordance with each connector ID. For example, the discrimination space for the hardware module 14a connected to the connector 12a is set to a range from (C0000000) to (C000000F), the discrimination space for the hardware module 14b connected to the connector 12b is set to a range from (C0000010) to (C000001F), and so on.

As the assigned discrimination space is accessed by CPU 10, the discrimination interface 16a of the hardware module 14a is connected to the data bus 19.

The discrimination interface 16a which received the enable signal a outputs attribute data to the data bus 19 via the connector 12a, so that CPU 10 can recognize that the hardware module at the connector 12a is a hard disk 20.

The discrimination interface 16a has a function to store a start address of an assigned function space. Data transfer between CPU 10 and the hard disk 20 via the function interface 18a and data bus 19 is carried out within the function space at addresses determined by the start address (which CPU 10 designates) and the capacity specific to the hardware module 14a.

The comparator 17a outputs an enable signal b only when the address pattern on the address bus 11 falls within the address space (range) defined by the start address stored in the discrimination interface 16a and the capacity required by the function interface 18a.

Upon reception of the enable signal b, the function interface 18a controls an application, i.e., the hard disk 20 for the data transfer to and from the data bus 19.

Figure 4:
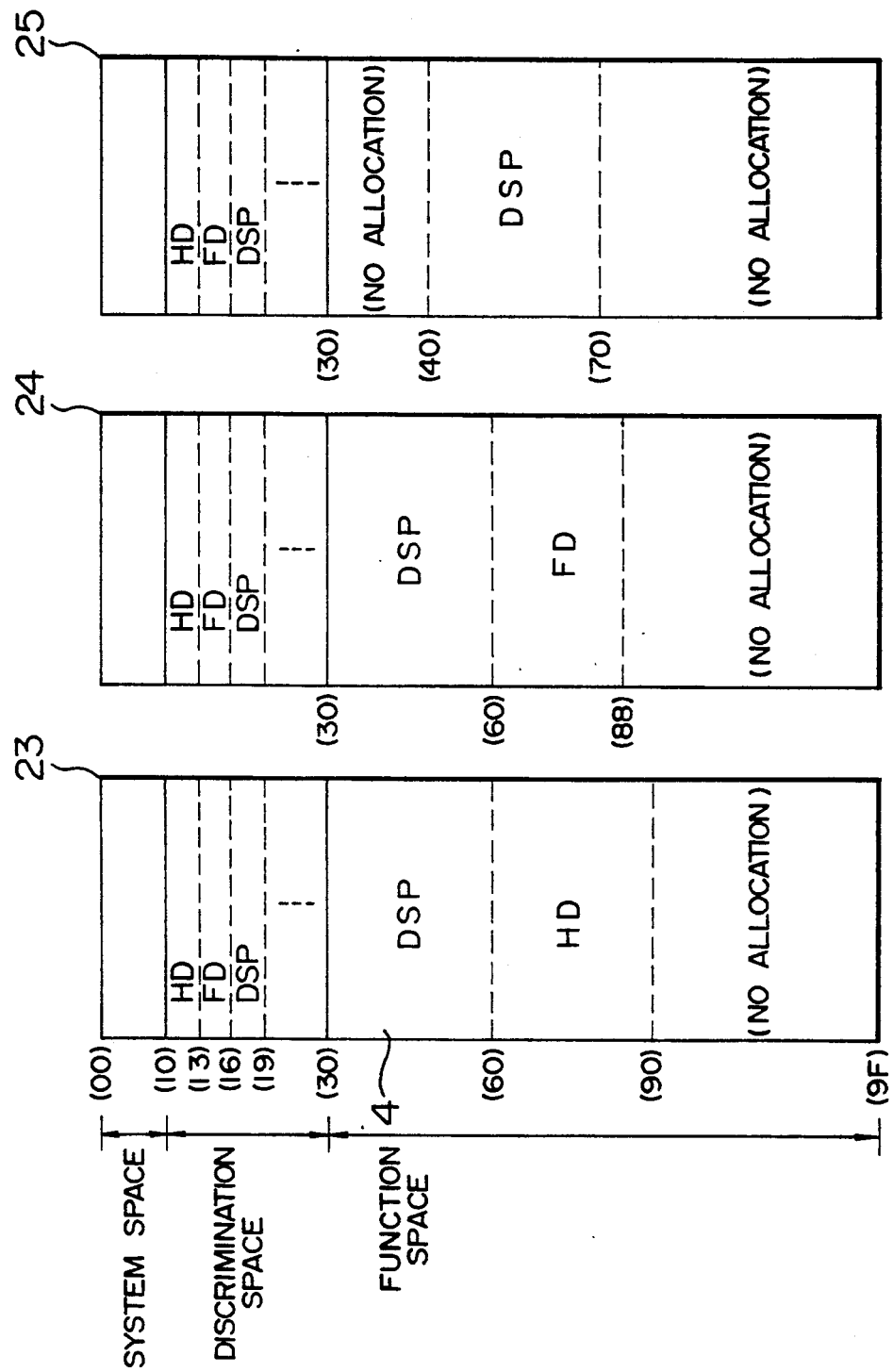
FIG. 4 illustrates changes in the contents of an address map.

FIG. 4 shows examples of address allocations for the system shown in the functional block diagram of FIG. 2. An address map 23 indicates the hardware modules 14c and 14a shown in FIG. 2 are assigned spaces within the function space 4, an address map 24 indicates that the hardware modules 14c and 14b are assigned a space, and an address map 25 indicates that only the hardware module 14c is assigned a space.

The operation of the system will be described in more detail.

In FIG. 1, the discrimination spaces 6a, 6b, and 6c of the hardware modules correspond to discrimination spaces 3 indicated by arrows. This correspondence is realized by each connector ID. If CPU 10 sends an address of the discrimination space 3 to the address bus 11, data can be written/read as desired to/from the corresponding one of the discrimination interface spaces 6a, 6b, and 6c. For example, if CPU 10 sends any one of the addresses (10) to (12), the discrimination interface space 6a can be accessed.

This access operation will be described with reference to FIG. 2. The connector ID generator 13a outputs a signal indicating that the hardware module 14a is being connected to the connector 12a. The comparator 15a uses this signal to recognize the address pattern to be discriminated, i.e., the addresses from (10) to (12). A correspondence between the address pattern and the connector ID may be prepared in advance in the form of a rule. For example, a connector ID "0" is allocated with discrimination space addresses (10) to (12), a connector ID "1" is allocated with discrimination space addresses (13) to (15), and so on. Alternatively, the following equations may be used for address allocation:

discrimination space start address=(connector ID)×3+10 discrimination space end address=(connector ID)×3+12

If CPU 10 accesses an address (10), the comparator 15a detects that the pattern on the address bus 11 is (10), and outputs the enable signal a. In this manner, data transfer is allowed between CPU 10 and the discrimination interface 16a via the data bus 19.

In this embodiment, the discrimination interface 16b is allocated with addresses (13) to (15), and the discrimination interface 16c is allocated with addresses (16) to (18).

The function interface spaces 7a and 7b correspond to function spaces 4 shown in FIG. 1. This means that if CPU 10 accesses the function space 4, the corresponding one of the function interface spaces indicated by arrows can be accessed.

The function interface space 7c has no corresponding area in function space 4, which means that CPU 10 is not allowed to access it.

Assignment of the function space 4 to the function interface spaces 7a, 7b and 7c can be determined arbitrarily by CPU 10 by accessing the discrimination space 3.

This assignment operation will be described with reference to FIG. 2. First, CPU 10 accesses the discrimination space to read the attribute of each hardware module 14a, 14b, 14c from each discrimination interface 16a, 16b, 16c, thereby recognizing the configuration of each hardware module. As the attribute data of the hardware module 14a, for example, there are the data representative of the type of a hard disk and the data representative of indicating that the capacity required for the function space has addresses (2F).

Next, CPU 10 writes a start address, e.g., (60) of an assignable function space into the discrimination interface 16a of the hardware module 14a which has the function interface 18a to be used thereafter. For example, if a start address (60) is to be written in the discrimination interface 16a at the address (12), an address pattern (12) appears on the address bus 11, whereas a pattern (60) appears on the data bus 19. Upon reception of the address pattern (12), the comparator 15a outputs the enable signal a so that the discrimination interface 16a stores therein the data (60). In this manner, writing the start address is completed.

Then, the comparator 17a is supplied with the start address (60) from the discrimination interface 16a and outputs the enable signal b to the function interface 18a only when an address pattern on the address bus 11 is one of the addresses from (60) to (8F).

In the above manner, when CPU 10 accesses the address space 4 at addresses from (60) to (8F), an access to the function interface 18a and hence to the hard disk 20 is allowed.

If CPU 10 clears the start address written in the discrimination interface 16a, the comparator 17a will not output the enable signal b for any address pattern. This is illustratively shown in FIG. 1 wherein assignment of the function interface 7a to the function space 4 is not present.

CPU 10 shown in FIG. 2 can thus freely allocate and clear a space address of the function space for each function interface 18a, 18b, 18c, by accessing each discrimination interface 16a, 16b, 16c.

Next, the operation by CPU 10 of recognizing the configuration of a hardware module and allocating and clearing an address of the function space for a hardware module will be described with reference to FIGS. 5 to 10.

Figure 5:
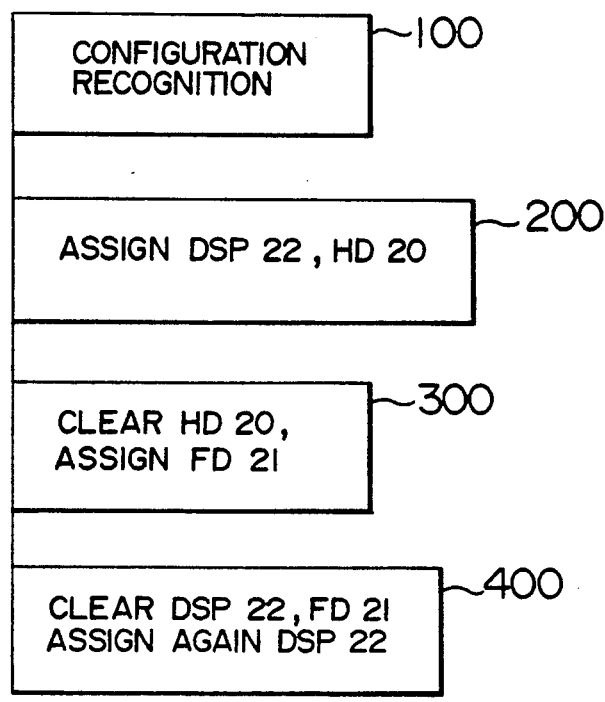
FIG. 5 to 10 are flow charts illustrating a configuration recognition, address allocation, and address clear operations.

The flow chart shown in FIG. 5 includes steps 100 to 400. At step 100 (configuration recognition step), CPU 10 recognizes the configuration of a hardware module at a connector when the hardware module is coupled to the connector and the power is turned on. At step 200, the display 22 and hard disk 20 for example are assigned function spaces. At step 300, the function space assigned to the hard disk 20 is cleared, and the floppy disk 21 is newly assigned a function space. At step 400, the function spaces assigned to the display 22 and floppy disk 21 are cleared, and the display 22 is again assigned a function space.

The assignment at step 200 corresponds to the address map 23 shown in FIG. 4, the state at step 300 corresponds to the address map 24, and the state at step 400 corresponds to the address map 25.

Figure 6:
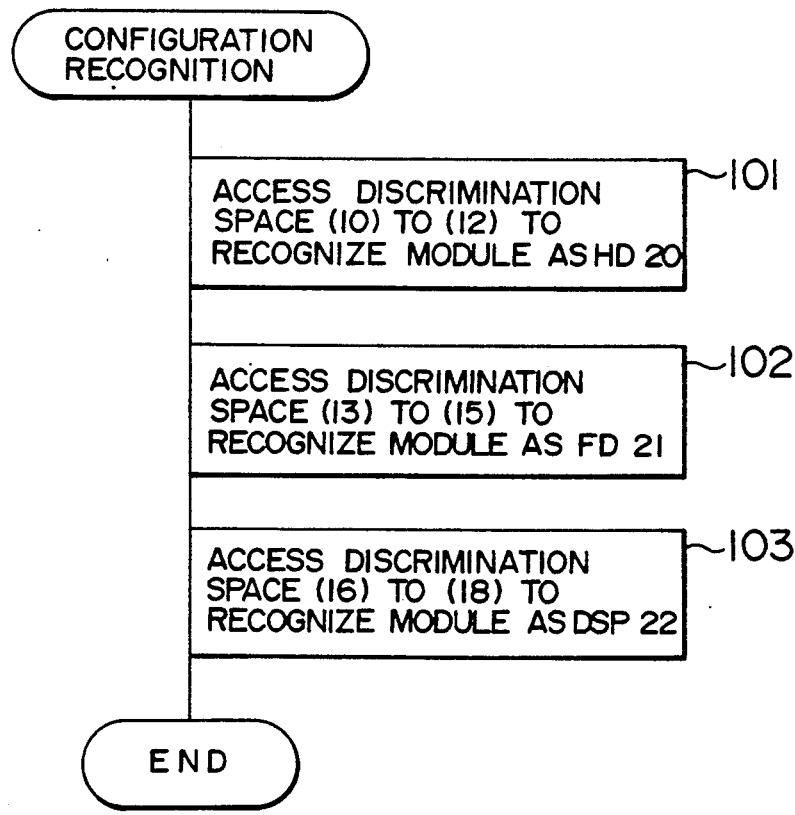

The configuration recognition will be described with reference to the flow chart shown in FIG. 6.

At step 101, CPU 10 sends one or all of the addresses (10) to (12) of the discrimination space to the address bus 11 for reading the attribute, using a read/write line (not shown). In this condition, the comparator 15a of the hardware module 14a outputs the enable signal a so that the discrimination interface 16a sends its own attribute (hard disk 20) to CPU 10 via the data bus 19. CPU 10 therefore recognizes that the hardware at the connector 12a is the hard disk 20.

Similarly, at step 102 it is recognized that the hardware module at the connector 12b is the floppy disk 21, and at step 103 it is recognized that the hardware module at the connector 12c is the display 22.

Figure 7:
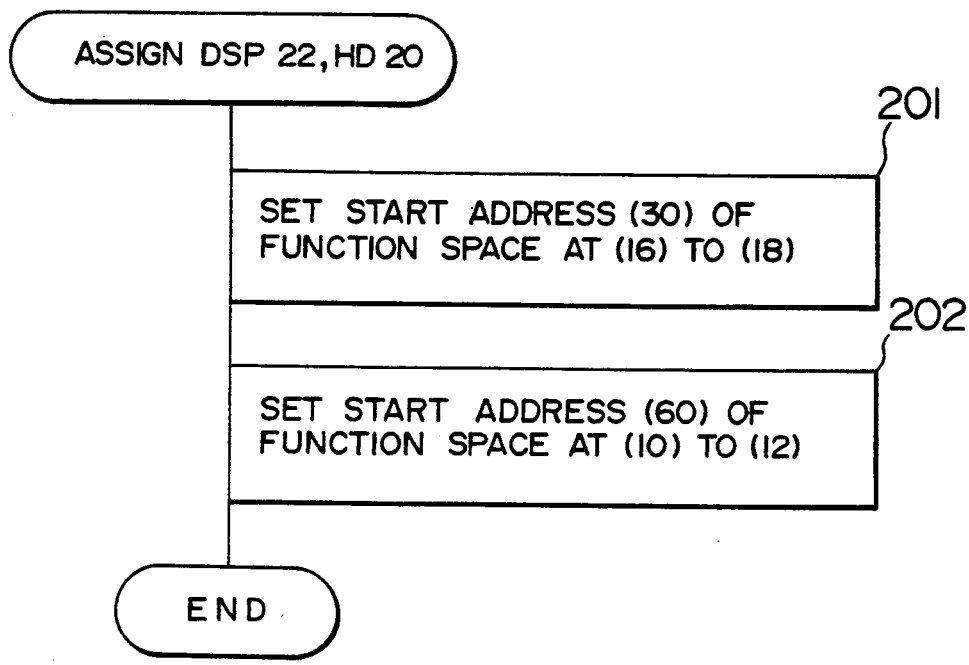

The flow chart shown in FIG. 7 illustrates the operation of assigning the function spaces to the display 22 and hard disk 20.

At step 201 the address of the function space for the display 22 is allocated. As described previously, CPU 10 sends the address (16) to the address bus 11 for writing a start address (30), using a read/write line (not shown). Since this address (16) is specific to the hardware module at the connector 12c, the comparator 15c sends the enable signal a to the discrimination interface 16c. When the address (16) is sent to the address bus, CPU 10 outputs to the data bus 19 the start address (30) of the function space to be assigned to the display 22. When the discrimination interface 16c receives the enable signal a, it is connected to the data bus 19 so that the start address (30) is written and stored in the discrimination interface 16c.

In the above case, the start address (30) is allocated to the address (16). It is also possible to allocate a plurality of start addresses, for example, to allocate a start address (60) or (90) to the address (16), and so on.

The stored start address is outputted to the comparator 17c.

Similarly, at step 202 a start address (60) is stored in the discrimination interface 16a.

Figure 8:
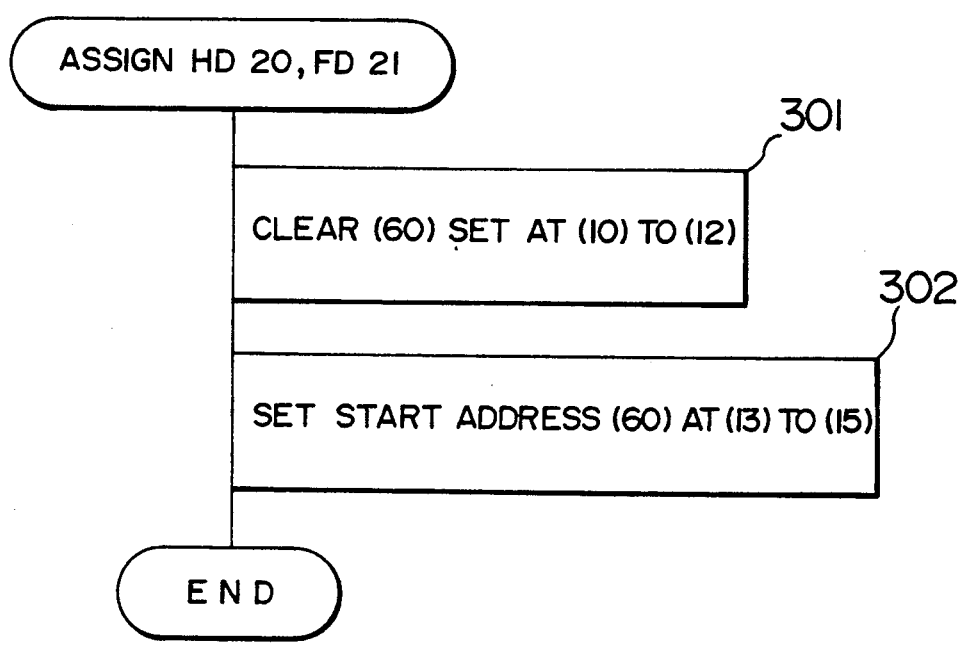

The flow chart shown in FIG. 8 illustrates the operation of clearing the address of the function space assigned to the hard disk 20 at step 200 and newly assigning the function space to the floppy disk 21.

Figure 10:
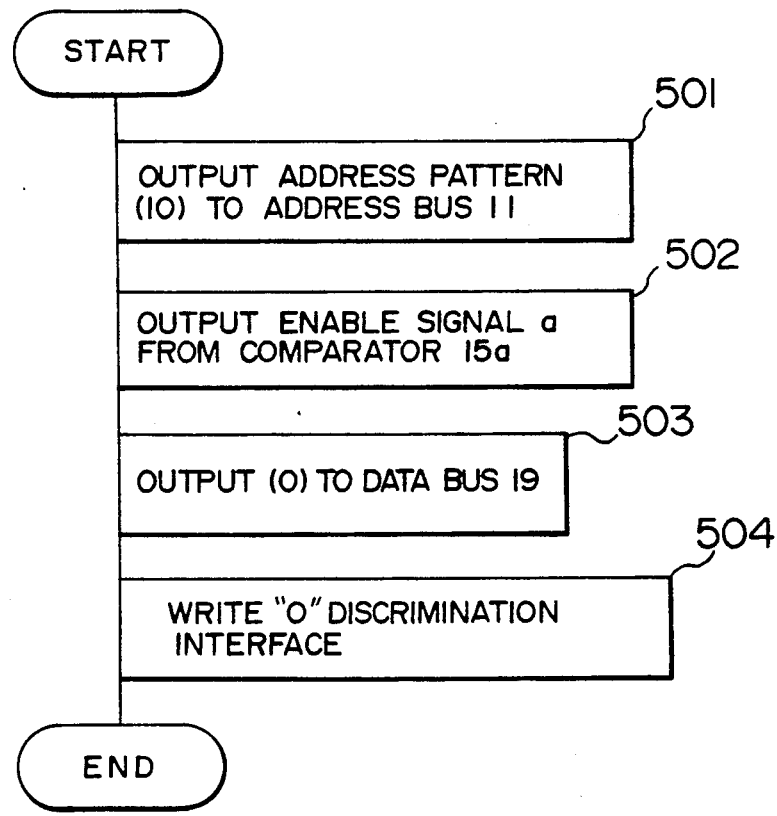

The details of clearing the set address at step 301 are shown in FIG. 10.

First, at step 501, CPU 10 sends (for writing address data) an address pattern (10) to the address bus 11. The comparator 15a outputs the enable signal a at step 502 to connect the discrimination interface 16a to the data bus 19. Next, at step 503 when CPU 10 outputs data (0) to the data bus, the discrimination interface 16a writes therein the data "0" at step 504. This address data (0) is for the system space. Since there is no hardware module at the address "0", it can be considered that the function space for the hard disk 20 was virtually cleared.

At step 302, the function space is assigned to the floppy disk 21 in a similar manner to that described above.

Figure 9:
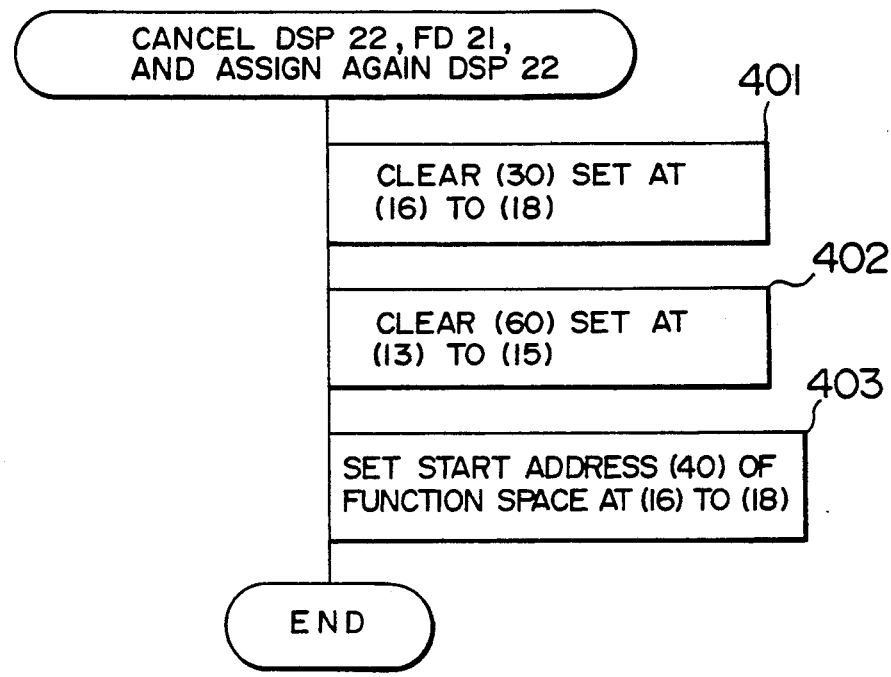

The flow chart shown in FIG. 9 illustrates the operation of clearing the addresses of the function space assigned to the display 22 and floppy disk 21 and assigning again the function space to the display 22.

Clearing the assigned function space is carried out in the manner described above, so the operation of assigning again the function space will be described.

The operations at step 403 are as follows. First, CPU 10 sends (for writing address data) an address (160) to the address bus 11. The comparator 15a outputs the enable signal a to connect the discrimination interface 16a to the data bus 19. Next, CPU 10 outputs a start address (40) of the function space to be assigned again to the data bus, and the discrimination interface 16a writes therein the start address (60).

FIG. 4 shows examples of assigning address spaces to the hardware modules of the system shown in FIG. 2. In the address space 23, the function space from address (30) to address (5F) is assigned to the display, and the function space from address (60) to address (8F) is assigned to the hard disk. CPU 10 writes data in the function space from address (30) to address (5F) to display the data on the display 22, and writes data in the function space from address (60) to address (8F) to write the data in the hard disk 20. In order to assign the function space, the start address is written at the addresses (10) to (12) for the hard disk, and at the addresses (16) to (18) for the floppy disk. No start address is written at the addresses (13) to (15) in the case of the address space 23.

Next, if the floppy disk 21 is intended to be accessed after the read/write completion of the hard disk 20, CPU 10 accesses the start address data at the addresses (10) to (12) and cancels it. Then, the address space 24 is obtained. In this address space 24, if the address (61) for example is accessed, the floppy disk 21 can be accessed in place of the hard disk 20.

In a similar manner, the address space 25 can be obtained which has a function space assigned only to the display 22.

As seen from the above embodiment, although the capacity of the function space of the address space has addresses (70), the sum of function spaces required by the function interfaces of the hardware modules has addresses (88). The three function interfaces can nevertheless be assigned space-divisionally and time divisionally to the function space 4.

Figure 11:
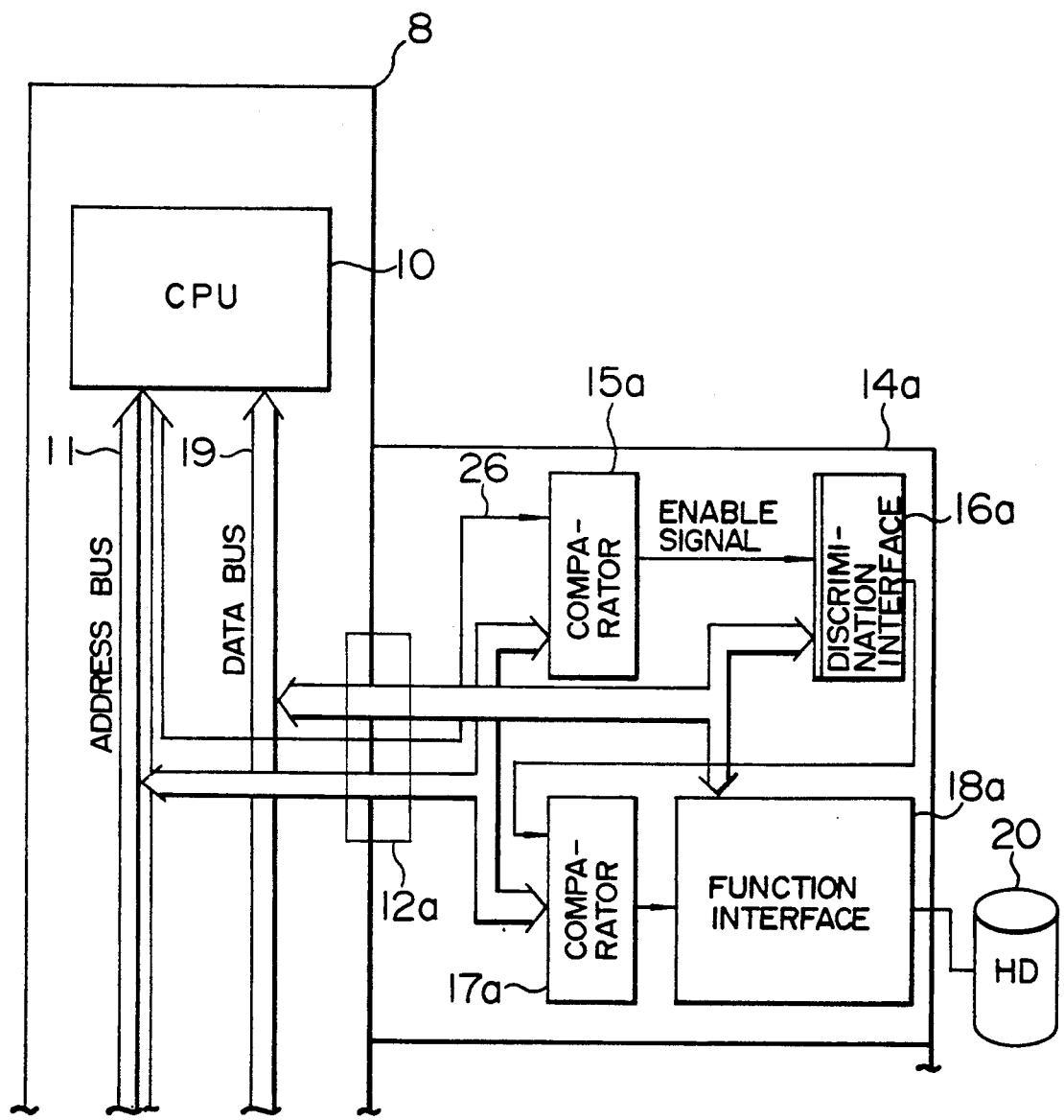
FIG. 11 is a block diagram showing another embodiment of the address bus control system.

FIG. 11 is a functional block diagram of another embodiment of this invention. The different point from the system shown in FIG. 2 is that instead of using the connector ID generator for generating a connector ID, a particular address line is used.

In this embodiment, although the discrimination space within the address space is limited, the circuit arrangement becomes simple.

Furthermore, although a CPU has been used as a bus master for the simplicity of description, other devices such as those used during DMA may be used for similar address allocation.

What is claimed is:

1. A bus control system for use in an information processing system, comprising:
   a bus including an address bus portion having a predetermined number of address lines which establish a bus address space;
   a plurality of hardware modules connected to said bus including said address bus portion, each of said hardware modules requiring a respective amount of bus address space for use by a device to be controlled thereby; and
   a bus controller coupled to said bus for periodically assigning portions of bus address space to respective hardware modules on a time-division basis.

2. A control bus system according to claim 1, wherein the total bus address space required by all of said hardware modules exceeds the total bus address space of said bus, and wherein said bus controller includes assigning means for assigning portions of said bus address space in such a way that, at any given time, not all hardware modules have a portion of bus address space assigned thereto.

3. A control bus system according to claim 2, wherein each of said hardware modules includes first storing means for storing discrimination information including attributes of a device to be controlled by the hardware module and a starting address of a portion of the bus address space to be used in the transmission of function information for that device.

4. A control bus system according to claim 3, wherein assigning means includes first means for assigning to each of said hardware modules a respective portion of said bus address space for access to the first storing means therein, and second means for assigning to selected hardware modules on a time-division basis a portion of the bus address space for storing function information by selectively transmitting a starting address and an indication of the storage capacity of the function information storing portion to the first storing means of the hardware module.

5. A control bus system according to claim 1, wherein said bus controller includes assigning means for assigning to each of said hardware modules respective first portions o said bus address space for use in accessing attribute data from the respective hardware modules and for assigning to selected hardware modules on a time-division basis respective second portions of the bus address space to be used in the transmission of function information for the device to be controlled by the hardware module.

6. A control bus system according to claim 5, wherein each of said hardware modules includes first means for storing attribute data indicating attributes of the device to be controlled by the hardware module and a starting address of a second portion of the bus address space, when such second portion has been assigned to the hardware module.

7. A control bus system according to claim 6, wherein each of said hardware modules also includes second means for storing function information for the device to be controlled by the hardware module.

8. A control bus system according to claim 7, wherein each of said hardware modules further includes first control means coupled to said address bus portion for limiting access to the first means in the hardware module to addresses within the first portion of the bus address space assigned to the hardware module by said assigning means, and second control means for limiting access to the second means in the hardware module to addresses within the second portion of the bus address space as determined from a starting address stored in the first means of the hardware module and the required capacity of said second means.

9. An address bus control system in which a controller having a central processing unit is connected via an address bus and a data bus to a plurality of hardware modules which control devices to be controlled, comprising:
- means for assigning addresses on said address bus to establish at least a discrimination space and a function space within an address space defined by said address bus, said discrimination space defining an address area allocated to addresses provided for said hardware modules connected to said address bus and said data bus, and said function space defining an address area used to perform data transfer between said data bus and relevant ones of the devices to be controlled by the hardware module allocated to the respective discrimination space; and
- store means provided for each of said hardware modules and coupled to be accessed by an address within said discrimination space for storing an address allocated to said function space, thereby allowing data transfer between the data bus and the device to be controlled by the hardware module in accordance with the address stored in the store means, while prohibiting said data transfer upon clearing of the address in said store means.

10. An address bus control system according to claim 9, wherein the address provided to each of said hardware modules is an address provided for a respective connector connected to each hardware module.

11. An address bus control system according to claim 9, wherein assigning means is part of said central processing unit.

12. An address bus control system according to claim 9, wherein said central processing unit includes means for registering or clearing in the store means of a hardware module an address allocated to the function space thereof.

13. An address bus control system in which a controller having a central processing unit is connected by connectors via an address bus and a data bus to a plurality of hardware modules which control devices to be controlled, comprising:
- means for assigning addresses on said address bus to establish at least a discrimination space and a function space within an address space defined by said address bus, said discrimination space being an address area corresponding to addresses provided for each of said connectors connecting said hardware modules, and said function space being an address area used to perform data transfer between said data bus and relevant ones of the devices to be controlled by the hardware module allocated to said discrimination space; and
- each hardware module including means responsive to designation of an address of the hardware module in the discrimination space for outputting an attribute of the hardware module itself on said data bus, store means responsive to an address in the discrimination space for inputting an address in a function space to store data, and communication means responsive to storage of an address in said store means for permitting communication between said data bus and a device to be controlled by the hardware module.

14. An address bus system according to claim 13, wherein said central processing unit includes means for sending an address in said discrimination space to each of the connectors and means responsive to an attribute of said hardware module received via said data bus for determining that a relevant hardware module is connected to a relevant connector.

15. An address bus control system according to claim 13, wherein said attribute of a hardware module includes information on the storage capacity which the hardware module requires.

* * * * *